United States Patent [19]

Takenaka

[11] Patent Number: 4,961,086
[45] Date of Patent: Oct. 2, 1990

[54] DEVICE FOR READING POSITIONAL INFORMATION ON PHOTOGRAPHIC FILMS

[75] Inventor: Yuji Takenaka, Kanagawa, Japan

[73] Assignee: Fuji Photo Film Co., Ltd., Kanagawa, Japan

[21] Appl. No.: 338,248

[22] Filed: Apr. 14, 1989

[30] Foreign Application Priority Data

Apr. 15, 1988 [JP] Japan ................................. 63-92728

[51] Int. Cl.$^5$ ............................................. G03B 27/52
[52] U.S. Cl. ....................................... 355/41; 355/77; 355/38; 235/462
[58] Field of Search ....................... 355/38, 68, 77, 41; 235/437, 438, 462, 463; 250/559, 561, 571; 353/26 A

[56] References Cited

U.S. PATENT DOCUMENTS

| | | | |
|---|---|---|---|
| 4,414,468 | 11/1983 | Laurer et al. | 235/462 |
| 4,707,120 | 11/1982 | Yamamoto | 355/38 |
| 4,797,713 | 1/1989 | Terashita et al. | 355/38 X |

FOREIGN PATENT DOCUMENTS 63-305336 12/1988 Japan ................................. 355/41

Primary Examiner—Michael L. Gellner
Assistant Examiner—D. Rutledge
Attorney, Agent, or Firm—Sughrue, Mion, Zinn, Macpeak & Seas

[57] ABSTRACT

A device for reading positional information on photographic films used for reading, when a photographic film is being fed, pieces of positional information provided on the film in a predetermined order and in correspondence with a plurality of image frames recorded on the film in the longitudinal direction thereof. The device is designed to determine whether or not any piece of positional information read has been erroneously read; when it is determined to have been erroneously read, the device selects the correct image frame on the basis of those pieces of positional information for image frames which are adjacent to that piece of positional information determined to have been erroneously read. Thus, even if an error has occurred in the reading of positional information, the subsequent processes need not be interrupted.

14 Claims, 9 Drawing Sheets

DEVICE FOR READING POSITIONAL INFORMATION ON PHOTOGRAPHIC FILMS

BACKGROUND OF THE INVENTION

1. Field of the Invention

This invention relates to a device for reading positional information on photographic films which is used for checking the frame number and the position of each image frame of a film by reading positional information provided for each image frame.

2. Description of the Related Art

Generally, photographic printing apparatuses are so designed that a photographic film, such as a negative film or a positive film, is set in a negative carrier, and is then brought to a printing position in the body of the printing apparatus so as to print on print paper the images on the film. Attached to the negative carrier is a feeding device which serves to feed an elongated negative film in the longitudinal direction and successively position the image frames thereon in the printing position to allow printing to be effected.

A mark indicative of positional information is provided for each image frame at a position in the vicinity thereof, the relative position of each mark with respect to the corresponding image frame being the same throughout the film. Any image frame whose image is to be printed can be selected by reading the positional information allotted thereto by means of a sensor. That image frame is automatically brought to the printing position by virtue of notches formed on the film in correspondence with the image frames. Positional information is provided in the form of bar codes which are arranged in a longitudinal direction of the film in correspondence with the frame numbers allotted to the frames in a predetermined sequence. By entering a desired frame number, the operator can search for the bar code corresponding to that frame number. Accordingly, frame positioning can be easily performed even when image frames are to be printed in a discontinuous order, which can be the case at the time of an order for reprints or extra prints.

However, if an error occurs in the reading of bar codes, an image frame having a frame number not corresponding to the one entered may be placed in the printing position. It can even happen that a specified frame number cannot be found. To prevent such malfunctioning of the printing apparatus due to reading errors, the operator has to check the frame number each time an image frame is placed in the printing position to make sure that the correct image frame has been placed in position, resulting in poor operational efficiency.

SUMMARY OF THE INVENTION

The present invention has been contrived in view of the above problems experienced with conventional reading devices Accordingly, it is an object of this invention to provide a device for reading positional information on photographic films which makes it possible to check the frame number and position of any specified image frame even if the positional information corresponding to that specified image frame is erroneously read.

In accordance with this invention, there is provided a device for reading positional information on photographic films used for reading pieces of positional information provided on an elongated film while it is being fed. The pieces of positional information are provided on the film in a predetermined order and in correspondence with a plurality of image frames recorded longitudinally on the film. The device for reading positional information on photographic films comprises a determining means for determining whether or not an error has occurred in the reading of the pieces of positional information, and selecting means for selecting the correct piece of positional information. If the determining means determine that a piece of positional information has been erroneously read, the selecting means selects the correct piece of positional information on the basis of those pieces of positional information adjacent to that piece of positional information which is determined to have been erroneously read.

In accordance with this invention, pieces of positional information provided on a film are read while the film is fed. The determining means determines whether or not the pieces of positional information have been correctly read (whether or not a reading error has occurred). That is, since the pieces of positional information are arranged in a predetermined order, any piece of information to be read can be anticipated. Thus, by comparing them with each other, the propriety thereof can be easily determined.

If the determining means determines a piece of positional information to have been read erroneously, the piece of positional information which can be inferred on the basis of those pieces of positional information which are adjacent to that piece of positional information determined to have been read erroneously is established as the piece of positional information which has been erroneously read, so that a series of processes including printing need not be interrupted because of a reading error. Furthermore, since the position where this selected piece of positional information is provided is set between adjacent pieces of positional information, the image frame corresponding to the piece of positional information erroneously read can be easily brought to a predetermined position, such as the printing position.

DETAILED DESCRIPTION OF THE PREFERRED EMBODIMENTS

Figure 1:
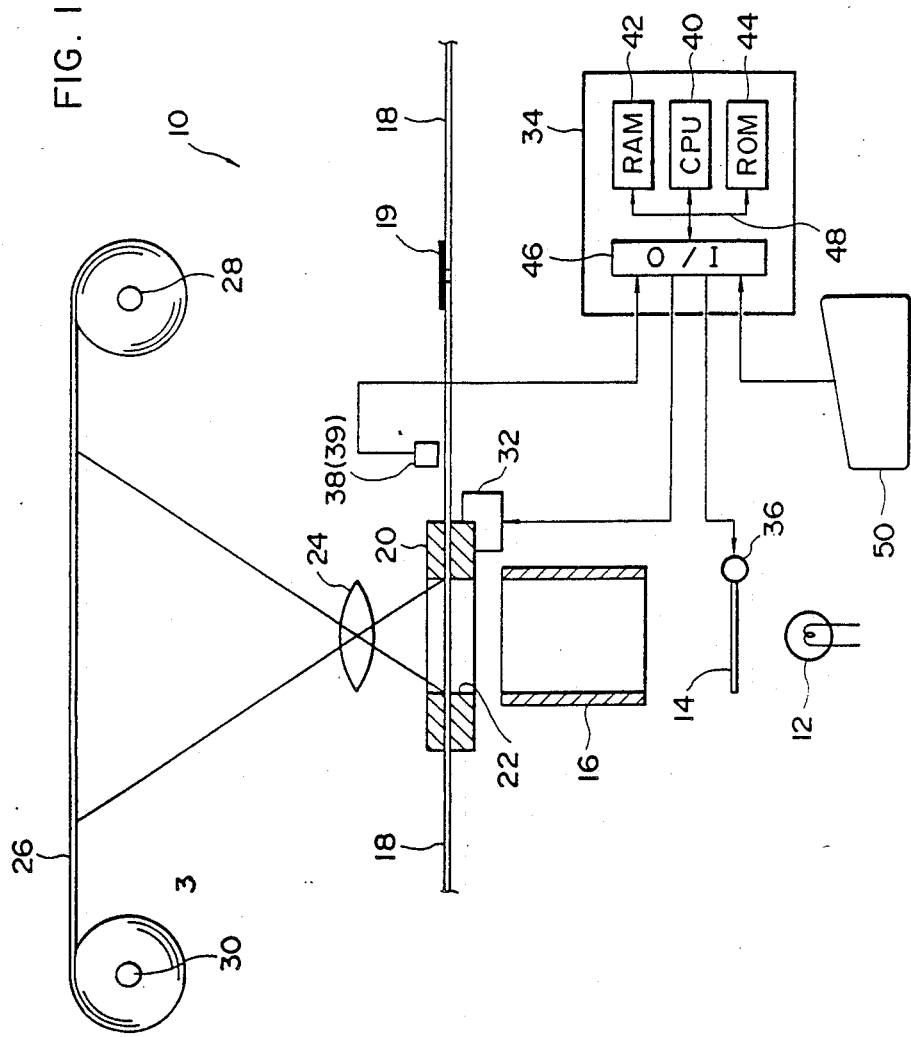
FIG. 1 is a schematic diagram showing an embodiment of a photographic printing apparatus to which the present invention is applied.

FIG. 1 shows a photographic printing apparatus to which this invention is applied. The light beam from a light source 12 is transmitted through a filter (not shown), a shutter 14 and a light diffusion cylinder 16, reaching a negative film 18 which serves as the photographic film. This negative film 18 has an elongated configuration and includes a plurality of longitudinally arranged image frames on which images are recorded. The ends of the negative film 18 are connected through splicing tapes 19 to other negative films 18 of the same configuration, thus making it possible to feed a plurality of negative films 18 continuously.

The negative film 18 is retained by a negative carrier 20 which includes an opening 22. When an image frame whose image is to be printed is positioned in this opening, the image is transmitted to a lens 24. The negative film 18 includes notches 18B formed in correspondence with the image frames. By detecting those notches 18B by means of a notch sensor (not shown), any predetermined image frame can be easily brought to the printing position These notches 18B are formed when checking the film 18 by means of a notch puncher (not shown) after the development thereof.

The light beam transmitted through the lens 24 is applied to an emulsion surface of a print paper sheet 26, which is thus exposed. The print paper sheet 26 is provided in the form of a laminated roll wound around a supply roll 28. When effecting exposure for an image, the print paper is supplied by a corresponding length from the supply roll 28 and is taken up by a take-up roll 30.

The negative carrier 20 is equipped with a driving device 32 for feeding the negative film 18. This driving device 32 is operated by a signal from a controller 34. The abovementioned shutter 14 is also connected to the controller 34 through a driver 36 so as to be opened for a predetermined length of time when printing.

Provided on the upstream side of the negative carrier 20 are two parts of positional information detecting sensors 38, 39 which serve to read bar codes 18A (see FIG. 2) provided on the negative film 18 while it moves. These positional information detecting sensors 38, 39 are arranged in the longitudinal direction of the bar codes 18A so that they may detect the presence of a bar code 18A in the vicinity of the longitudinal ends thereof. The data corresponding to the bar code 18A read by the positional information detecting sensors 38, 39 is supplied to the controller 34.

The negative film 18 may include symbols or characters situated on the roule on which the bar codes 18A are shifted. That is, Arabic numerals indicative of the image frame numbers may be provided on the film along with the bar codes. Accordingly, a reading error will occur when such numerals are taken for bar codes by mistake. It should be noted that in this regard all the bar codes have the same width while the numerals, etc. vary in configuration in the vertical direction. In the embodiment shown, the controller 34 determines whether or not the detection values obtained by the two positional information detecting sensors 38 and 39 agree with each other, thereby preventing symbols etc. other than bar codes from being read as bar codes.

The controller 34 comprises a CPU 40, a RAM 42, a ROM 44, an I/O port (input/output port) 46, and a bus 48, such as a data bus or a control bus, etc. The signal lines from a driver 36 of a shutter 14, a driving device 32 and the positional information detecting sensors 38, 39 are connected to the I/O port 46. Also connected to this I/0 port 46 is a keyboard 50.

Figure 2:
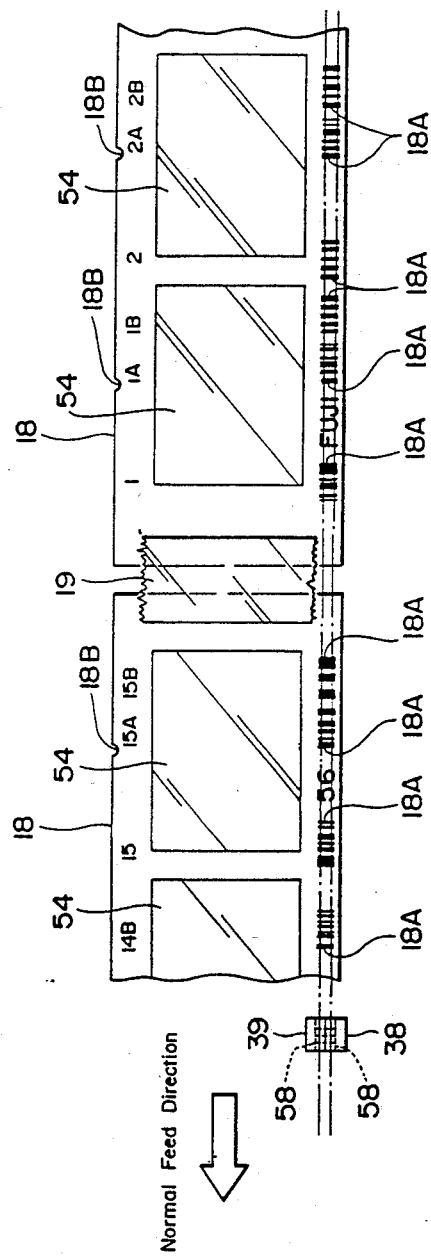
FIG. 2 is a plan view of a negative film.

As shown in FIG. 2, the bar codes 18A are so arranged on the negative film 18 that the relative position of each bar code with respect to the corresponding image frame is the same throughout the film, and the positional information reading sensors 38, 39 are arranged at positions facing the route on which the bar codes 18A are shifted.

Figure 3:
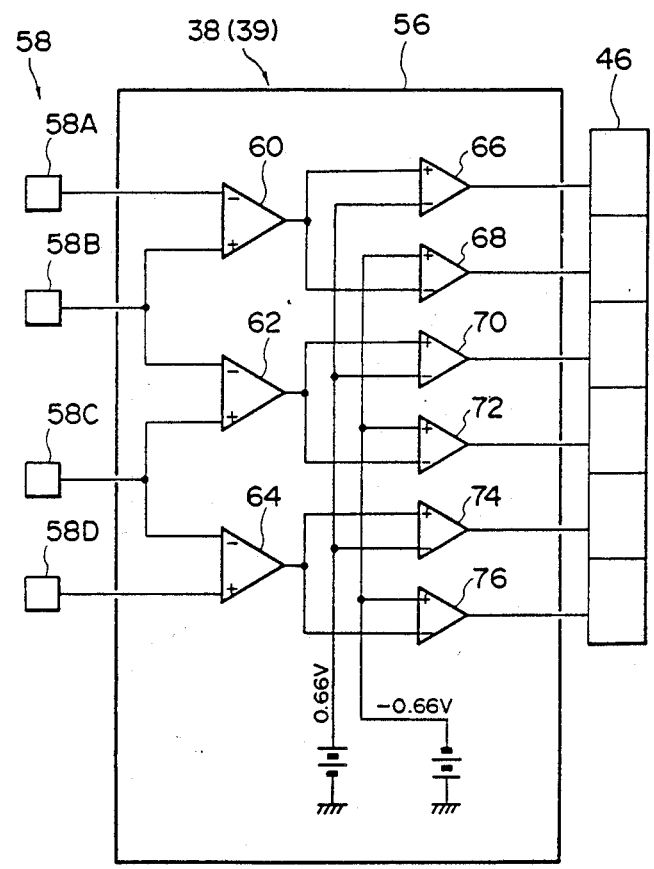
FIG. 3 is a block diagram of the data conversion circuit of a positional information detecting sensor.

Since the bar codes 18A correspond to the image frame numbers, the frame number corresponding to any particular bar code 18A can be recognized as such by processing the data obtained by positional information reading sensors 38, 39 in a data conversion circuit 56 (see FIG. 3). Accordingly, when searching for the image frame corresponding to a specified frame number entered through a keyboard, the entered frame number can be compared with the frame number indicated by the data obtained by the positional information reading sensors. The frame numbers are arranged in previously determined order as 1, 1A, 1B, 2, 2A, 2B, 3, 3A . . .), and are stored in the RAM 42 of the controller 34.

As shown in FIG. 3, the positional information reading sensors 38, 39 are equipped with four detecting sections 58A, 58B, 58C and 58D as well as the abovementioned data conversion circuit 56. A bar code 18A is composed of wide and narrow bar code sections. The arrangement distances between the detecting sections 58A, 58B, 58C and 58D correspond to the width of the wide bar code sections, and the distance between two adjacent detecting sections corresponds to the narrow bar code sections.

The data conversion circuit 56 includes three subtracters 60, 62 and 64. The negative input terminal of the first subtracter 60 is connected to the signal line of the detecting section 58A. The positive input terminal thereof is connected to the signal line of the detecting section 58B. The negative input terminal of the second subtracter 62 is connected to the signal line of the detecting section 58B. The positive input terminal thereof is connected to the signal line of the detecting section 58C. Further, the negative input terminal of the third subtracter 60 is connected to the signal line of the detecting section 58C. The positive input terminal thereof is connected to the signal line of the detecting section 58D.

The data conversion circuit 56 further includes six comparators 66, 68, 70, 72, 74 and 76. The output signal line of the first subtracter 60 is connected to the positive input terminal of the first comparator 66 and to the negative input terminal of the second comparator 68. The output signal line of the second subtracter 62 is connected to the positive input terminal of the third comparator 70 and to the negative input terminal of the fourth comparator 72. The output signal line of the third subtracter 64 is connected to the positive input terminal of the fifth comparator 74 and to the negative input terminal of the sixth comparator 76. Further, a positive voltage (+0.66V) is applied to the negative input terminals of the first, third and fifth comparators 66, 70 and 74. A negative voltage (−0.66V) is applied to the positive input terminals of the second, fourth and sixth comparators 68, 72 and 76. Because of this arrangement, data in accordance with the absolute values of the differences in output between adjacent detecting sections are input to the I/O port 46 of the controller 34. That is, suppose the outputs of the detecting sections 58A and 58B are A and D, respectively, and when, for example, |A−B| >0.66V, high-level signals are output from the first and second comparators. When |A−R-| <0.66V, low-level signals are output therefrom. This makes it possible to determine the differences in output between adjacent detecting sections. The data thus obtained is transmitted to the controller 34. In accordance with differences in output between the detecting sections 58A, 58B, 58C and 58D, the controller 34 determines whether it is a white or a black bar code section as well as whether it is a wide or a narrow bar code section, of a bar code 18A, that is passing the sensors.

Figure 4:
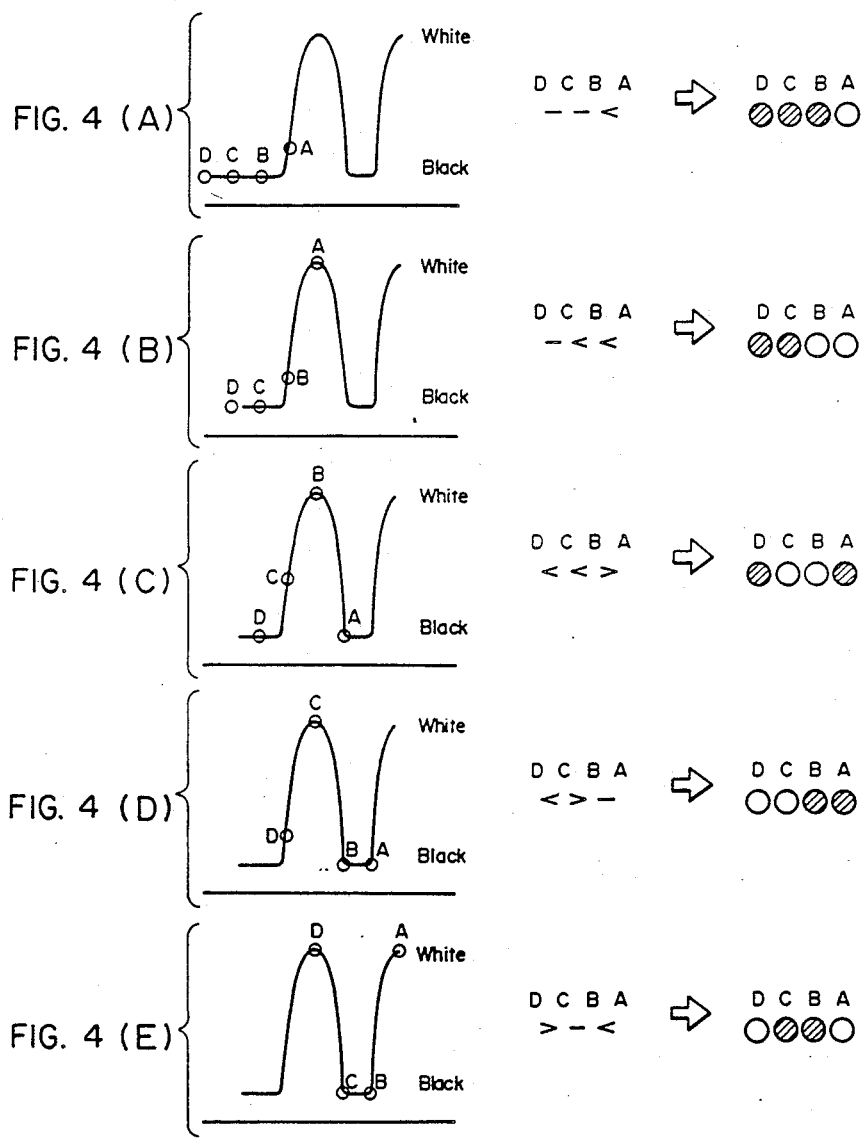
FIGS. 4A to 4E illustrate the process of distinguishing a bar code in accordance with the detection result obtained by the detecting sections.

The determining method will now be explained with reference to FIG. 4. The output of the detecting sections 58A, 58B, 58C and 58D will be referred to as A, B, C and D, respectively.

When $A>B=C=D$, as shown in FIG. 4(A), i.e., when only A exhibits a value which is relatively large with respect to the others, the detecting section 58A has distinguished a white bar code section.

When the negative film has shifted its position to attain the condition of FIG. 4(B) in which $A>B>C=D$, the detecting sections 58A and 58B have detected a white bar code section.

The condition shown in FIG. 4(C), where $A<B>C>D$, indicates that a white bar code section has passed the detecting section 58A. As a result, the detecting sections 58B and 58C detect a white bar code section, from which it can be known that the bar code section is a white and narrow one.

The condition shown in FIG. 4(D) in which $A=B>C>D$ indicates that the negative film has been shifted in the normal direction from the condition shown in FIG. 4(C). That is, it can be ascertained that the film is moving in the normal direction.

In the condition shown in FIG. 4(E), where $A>B=C<D$, only the detecting sections 58B and 58C have detected a black bar code section. It can be known from this that the next bar code section is a black and narrow one.

Figure 5:
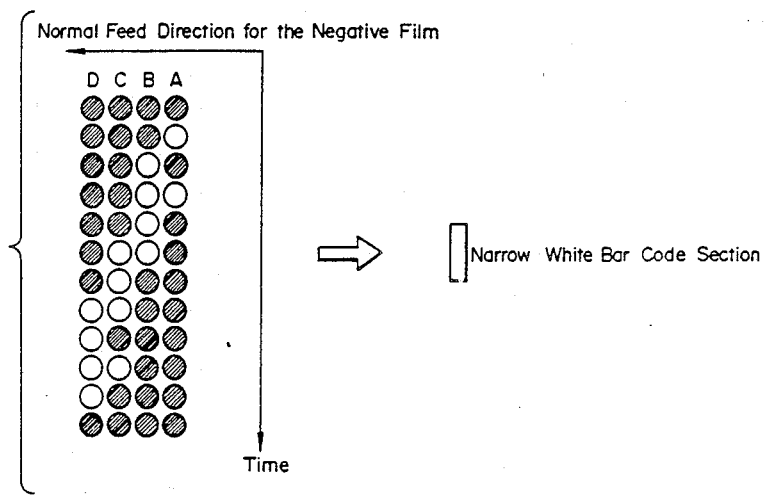
FIGS. 5A and 5B illustrate the way the detection outputs of the detecting sections change as a bar code shifts.
Figure 5:
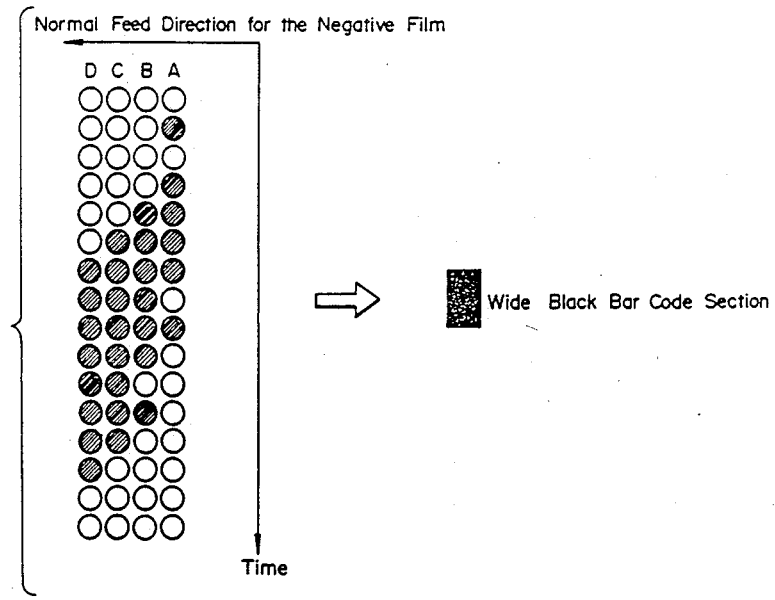

FIG. 5 shows the way the detection effected by the detecting sections 58A, 58B, 58C and 58D changes as a bar code 18A is shifted. The manner of changes in output of the detecting sections 58A, 58B, 58C and 58D shown in FIG. 5(A) corresponds to the movement of a narrow and white bar code section, and that shown in FIG. 5(B) corresponds to the movement of a wide and black bar code section As will be appreciated from the types of changes in the detection output of the detecting sections 58A, 58B, 38C and 38D shown in FIGS. 5(A) and 5(B), any slopping or reverse feed of the negative film can be recognized as such.

Figure 6:
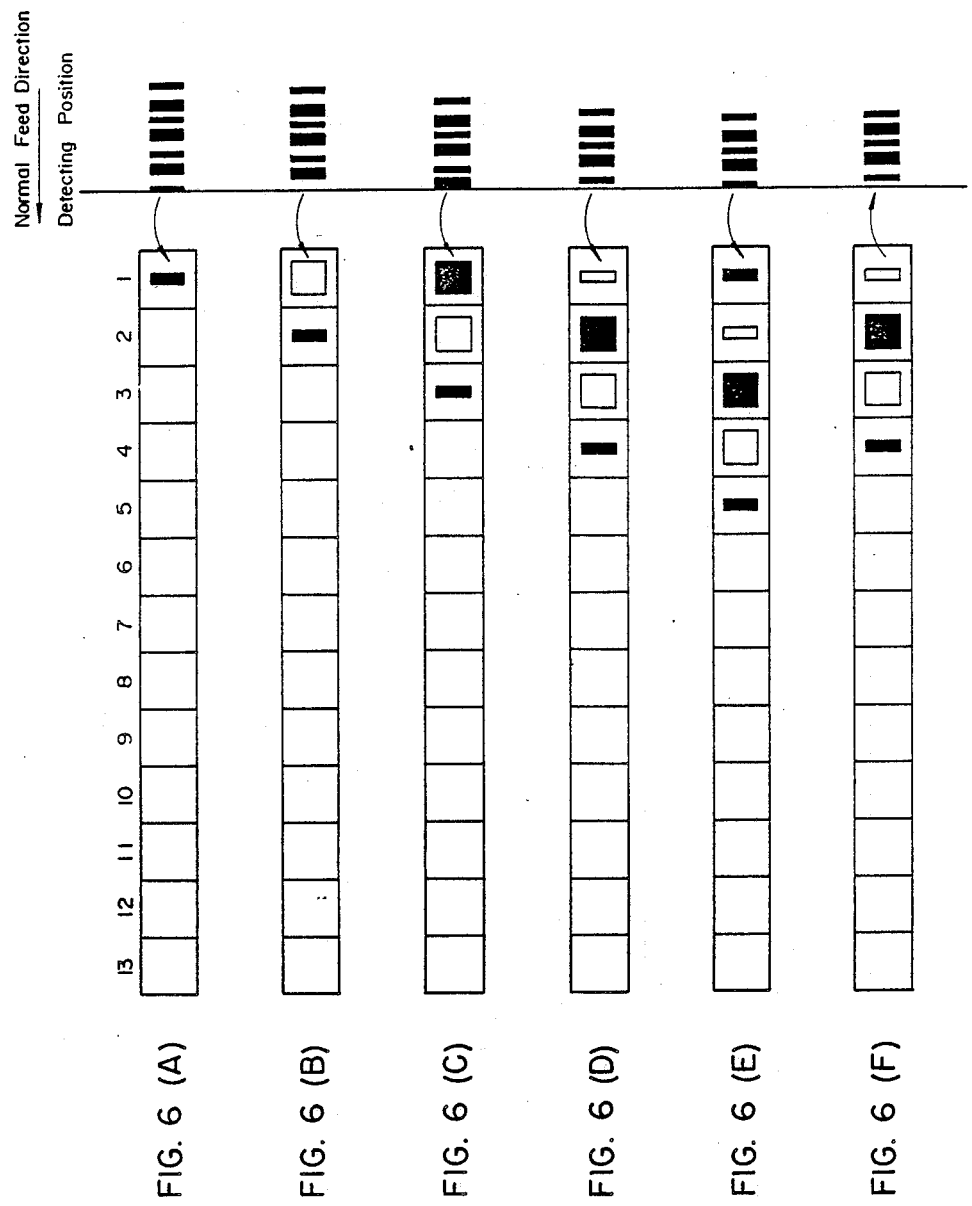
FIG. 6 illustrates the way the bar code sections are inserted into a series of tables.

By repeating the above-described detection, a series of bar code sections (thirteen of them in this embodiment) making up a bar code 18A are obtained, and are successively supplied to a series of tables in the RAM 12 (a buffer memory may be employed). As shown in FIG. 6, bar code sections are inserted into the tables from the right as seen in the figure, in the order in which they are detected. Those bar code sections which have already been inserted into series of tables are made to shift to the left successively to make room for the newly inserted ones. If the negative film 18 is fed in the reverse direction, the bar code sections in the tables are shifted to the right by a distance corresponding to the feed, and are successively extracted therefrom at the right-hand end. When every one of the thirteen tables has been supplied with a bar code section, the controller 34 performs data matching, whereby the image frame number corresponding to the bar code 18A can be obtained.

In this embodiment, the controller 34 compares the frame number obtained by reading the bar code 18A with the frame number previously stored in the RAM 42. That is, since the bar codes 18A to be read are arranged in a fixed order, they are input in the order of the frame numbers stored in the RAM 42. Accordingly, if a frame number stored in the RAM 42 does not agree with the frame number corresponding to a bar code 18A which has been read, it can be concluded that a reading error has occurred.

The controller 34 regards that frame number as the reading error frame number which is between the frame numbers before and after the frame number corresponding to the bar code 18A which has been erroneously read. Accordingly, when bringing to the printing position the image frame corresponding to the bar code 18A which has been erroneously read on the basis of the notches 18B, those bar codes 18A which are situated before and after that bar code are searched for. Then, the distance between adjacent bar codes is added to or subtracted from the normal shift distance, and the driving device 32 is controlled accordingly, thereby positioning the specified image frame in the printing position.

Furthermore, the positional information detecting sensors 58 also detect joint sections between negative films 18. That is, by detecting a splicing tape 19 connecting two negative films 18, it recognizes the beginning of a sheet of negative film 18. Each time a splicing tape 19 is detected, the frame numbers stored in the RAM 42 is renewed, starting with the initial numbers again.

Figure 8:
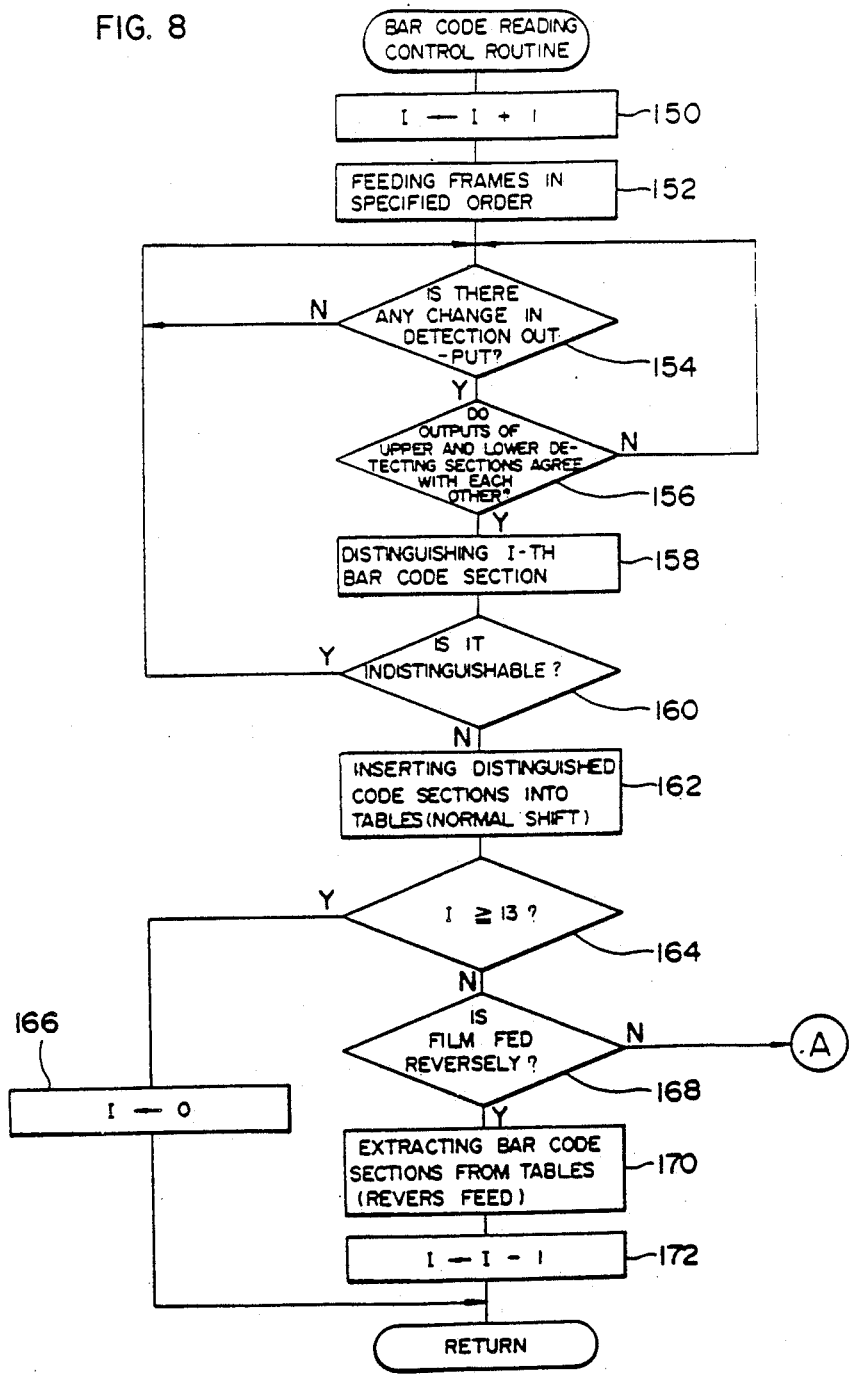
Figure 9:
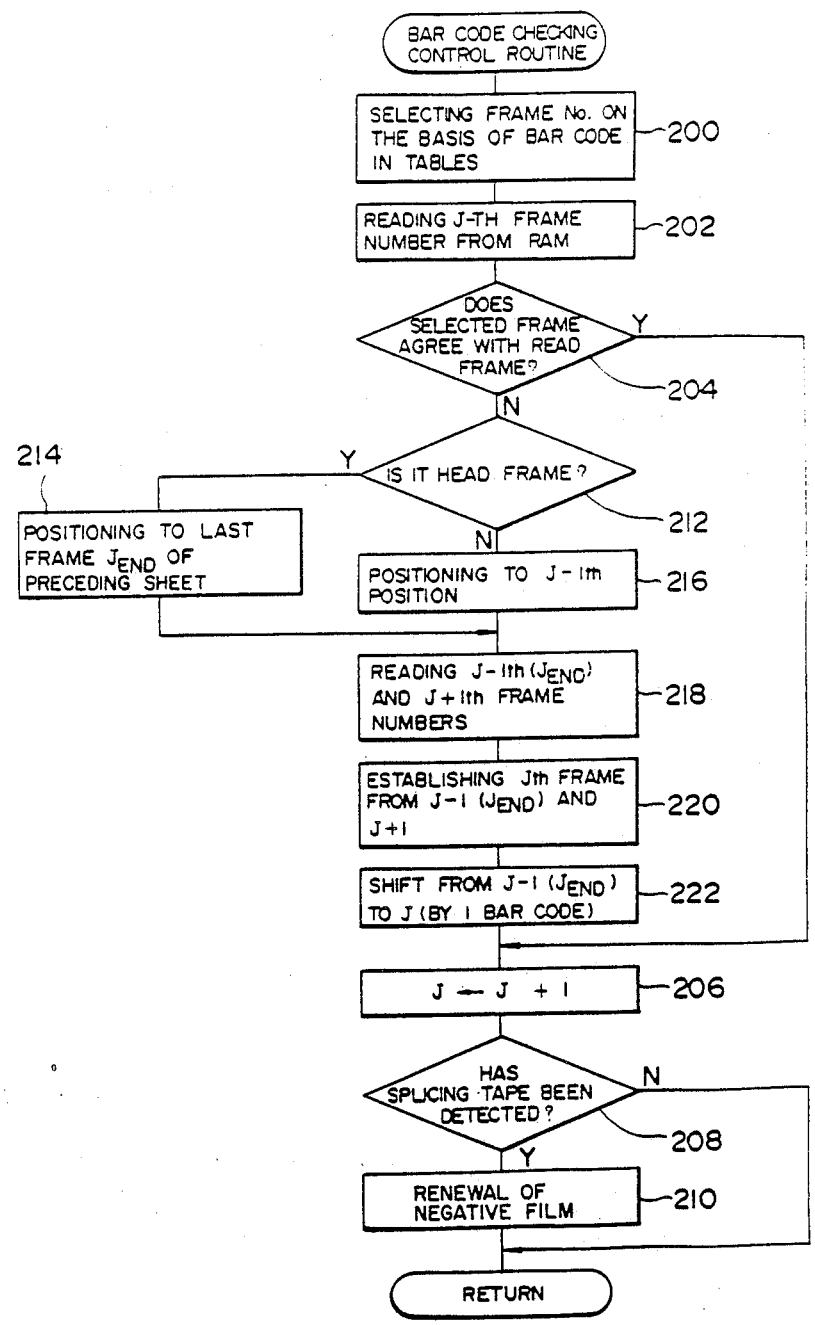

The operation of this embodiment will now be described with reference to the flowcharts of FIGS. 7 to 9.

Figure 7:
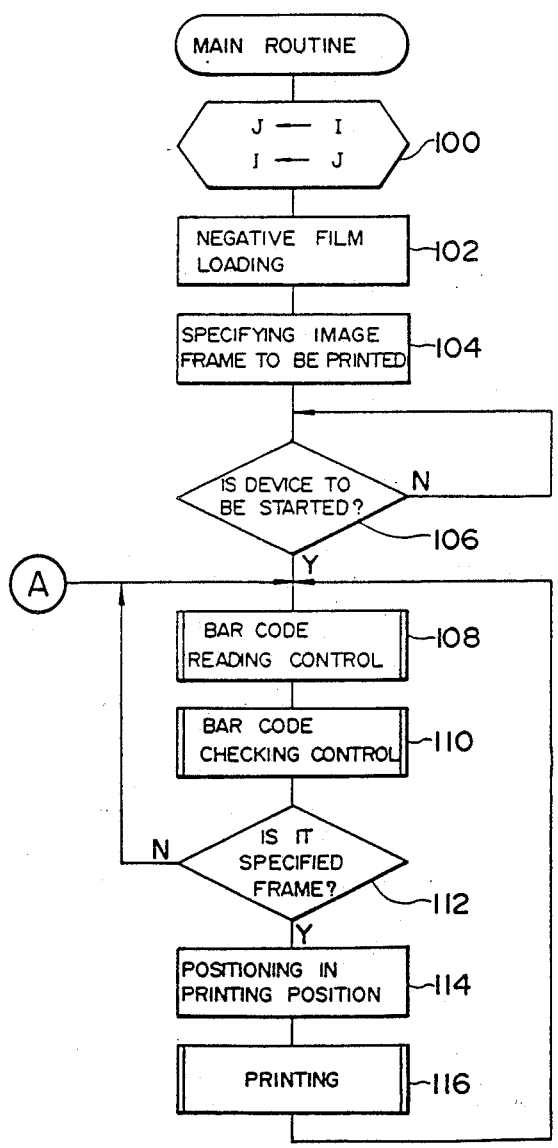
FIGS. 7 to 9 are flowcharts illustrating the control processes.

As shown in FIG. 7, variables J and I are set at 1 and 0, respectively, in Step 100. In Step 102, a negative film 18 is loaded. In this step, the initialization of the frame number of the head image frame and the frame numbers stored in RAM 42 is performed. In Step 104, the frame numbers of the image frames whose images are to be printed are specified. The specifying process may be continuous or intermittent.

Then, in Step 106, the operator starts the process by manipulating the start switch, etc. In Step 108, the reading of the bar codes 18A is performed, and, in Step 110, the bar codes 18A which have been read are checked. By thus reading and checking the bar codes 18A, the frame numbers are checked at a predetermined position (the position of a positional information reading sensor 38). These subroutines will be described below.

When the frame numbers have been checked in Steps 108 and 110, it is determined in Step 112 as to whether or not each of the checked image frames is a specified frame. If the result is negative, the procedure returns to Step 108, there being no need for performing printing If the result in Step 112 is affirmative, i.e., if a checked image frame is found to be a specified image frame, the procedure moves on to Step 114, setting the image frame ascertained in the printing position on the basis of the notches 18B When the specified image frame has been set in the printing position, the procedure moves on to Step 116 to perform printing, returning to Step 108 to search for the next specified frame. By repeating Steps 108, 110, 112 and 114, the specified image frames are successively set in the printing position to print their images.

Next, the control subroutine for reading bar codes will be described with reference to the flowchart of FIG. 8.

First, in Step 150, variable 1 is incremented. Then, in Step, 152, the negative film 18 is fed in the order specified in Step 104.

In Step 154, examination is made as to whether there has been any change in the output of the detecting sections 58A, 58B, 58C and 58D during the feed. If there has been none, Step 154 is repeated. If there has been some change in the detection output, the procedure moves on to Step 156, where it is examined whether the output of the two pairs of detecting sections 58A, 58B, 58C and 58D arranged at the ends in the longitudinal direction of the bar code 18A agree with each other. If the result is negative, i.e., if it is ascertained that they do not agree with each other, what is detected can be interpreted as a symbol which is not symmetrical in the longitudinal direction, such as a numeral. Accordingly, the procedure returns to Step 154, there being no need for transforming the symbol into a bar code in accordance with the detection output That is, the route along which the negative film 18 is fed can include some numerals or symbols in addition to the bar codes 18A, which will be detected by the detecting sections 58A, 58B, 58C and 58D. In view of this, this embodiment is so designed that a bar code 18A is read in the vicinity of the longitudinal ends thereof (see the chain line and the chain double-dashed line in FIG. 2), so that other symbols such as numerals are prevented from being interpreted as a bar code 18A by mistake, thereby avoiding any erroneous detection.

If it is ascertained in Step 156 that the upper and lower detection outputs agree with each other, what is detected can be interpreted as a bar code section. The procedure then moves on to Step 158, the bar code section being treated as the I-th section of a bar code. If it cannot be distinguished in this step, the procedure moves on to Step 160 to recognize it, and then to Step 154. If the I-th bar code section is identified as such in Step 158, it is recognized in Step 160. The procedure then moves on to Step 162, the bar code sections recognized being inserted into the series of tables in RAM 42 at its one end. If some bar code sections have already been inserted into some of the tables, the sections are successively shifted in the normal direction.

In the next step, Step 164, it is determined whether or not variable I has become thirteen, which represents the maximum of the number of bar code sections. If it is determined that I≧13, it can be concluded that all the bar code sections of a bar code 18A have been read. The procedure then moves on to Step 166, where variable I is reset to (0), and thus returning to the main routine.

If it is determined in Step 164 that I<13, it can be concluded that a bar code is being read, the procedure moving on to Step 168. It is determined in Step 168 whether or not the negative film 18 is being led in the reverse direction. If not, the procedure moves on to Step 108, i.e., the main routine. If the film is being reversely fed, the procedure moves on to Step 170, the bar codes sections being successively extracted from the row of tables at one end thereof (the right-hand side in FIG. 6) in accordance with the reverse feed distance The bar code sections remaining in the tables are then successively sifted in the reverse direction. When the procedure of Step 170 has been completed, variable I is decremented in Step 172. The procedure then returns to the main routine.

Thus, the bar code sections are detected one by one by virtue of changes in the detection output of the detecting sections 58A, 58B, 58C and 58D. If the film is fed in the reverse direction, the read bar codes sections are cancelled in accordance with the reverse feed distance This arrangement helps to avoid reading errors, thereby enabling the bar codes to be positively read.

Next, the routine of checking a read bar code will be illustrated with reference to the flowchart of FIG. 9.

First, the frame number is selected in Step 200 on the basis of the bar code 18A whose sections are in the tables. Then, in Step 202, the J-th frame number is read from among the frame numbers previously stored in RAM 42, the procedure moving on the Step 204.

In Step 204, the selected frame number is compared with the read frame number. If they agree with each other, the reading can be regarded as correct. The procedure moves on to Step 206. In Step 206, variable J is incremented. Then, it is determined in Step 208 whether or not a splicing tape 19 has been detected. If the result is affirmative, it is determined that one sheet of negative film 18 has terminated, and a renewal process of the negative film 18 is performed in Step 210, the procedure being returned. If no splicing tape 19 is detected in Step 208, the procedure for detecting bar codes on the negative film is continued, so that return is effected and Step 210 is skipped.

If a set frame number and a read frame number do not agree with each other in Step 204, it can be determined that the corresponding bar code has been erroneously read in which case the procedure moves on to Step 212. It is determined in Step 212 whether or not the image frame read is the head frame of a negative film 18. If it is, the procedure moves on to Step 214 where the last frame $J_{END}$ of the preceding sheet of negative film 18 is brought to the position of the positional information reading sensor. If the image frame read is not a head frame, the procedure moves on to Step 216. The J-1-th image frame is then brought to the position of the positional information reading sensor and the procedure moves on to Step 218. In Step 218, the J-1-th ($J_{END}$)and the J+1-th frame numbers are read from the RAM 42. Then, in Step 220, the above-mentioned selected frame is established as the J-th frame on the basis of the frame numbers of the J-1-th ($J_{END}$) and the J+1-th frame numbers. Next, in Step 222, the J-th image frame is brought to the position of the positional information reading sensor. Then the procedure moves on to Step 206. Since at this time the J-1-th ($J_{END}$) image frame is placed at the position of the positional information reading sensor, the film can be fed by the distance between adjacent bar codes. This makes it possible to bring the image frame corresponding to any bar code which has been erroneously read to a predetermined position, the image frame being recognized as the J-th image frame.

Thus, this embodiment makes it possible to detect any reading error of bar codes 18A. If a reading error has occurred, the frame number of the image frame concerned can be inferred on the basis of the frame numbers of the frames before and after that. Accordingly, it is not necessary to temporarily interrupt the printing of the image frame corresponding to the bar code which has been erroneously read. Printing can be performed smoothly in accordance with the specified order.

Furthermore, when a plurality of sheets of negative films are connected to each other, the joint sections can be recognized by detecting the splicing tapes 19 connecting the film sheets to each other, so that there is no danger of the frame number being erroneously recognized.

In addition, since in this embodiment the positional information reading sensors are arranged in the vicinity of the longitudinal ends of the bar codes. Other symbols, such as numerals, which move on the same route as the bar codes are prevented from being erroneously recognized as bar codes, thereby improving the operational efficiency of the photographic printing apparatus.

As described above, the positional information reading device for photographic films of this invention makes it possible to ascertain the frame number and the position of any specified image frame even if the positional information corresponding to this specified image frame is erroneously read.

What is claimed is:

1. A device for reading positional information on photographic films used for reading, when an elongated photographic film is being fed, pieces of positional information provided on the film in a predetermined order and in correspondence with a plurality of image frames recorded longitudinally on the film, comprising:
   determining means for determining whether or not an error has occurred in the reading of the pieces of positional information; and
   selecting means for selecting, if it is determined by said determining means that an error has occurred in the reading of the positional information, the correct image frame on the basis of those pieces of positional information for image frames which are adjacent to the piece of positional information determined to have been erroneously read.

2. A device for reading positional information on photographic films as claimed in claim 1, wherein said determining means are designed to determine whether or not any reading error has occurred by comparing previously stored positional information with positional information obtained by reading.

3. A device for reading positional information on photographic films as claimed in claim 2, wherein said piece of positional information consists of a plurality of information units arranged in the direction in which the photographic film is fed, and wherein reading means are provided which are designed to read said piece of positional information by successively reading said information units.

4. A device for reading positional information on photographic films as claimed in claim 3, further comprising memory means designed to successively shift and take in said information units in the order in which they are read by said reading means.

5. A device for reading positional information on photographic films as claimed in claim 4, wherein said memory means cause said information units to be successively shifted in the direction reverse to that in which they are taken in and to be extracted therefrom when said photographic film is fed in the reverse direction 6. A device for reading positional information on photographic films as claimed in claim 3, wherein a plurality of said photographic films are connected with each other at their ends in the longitudinal direction through connecting members, and wherein said reading means are designed to detect the passing of said connecting members 7. A device for reading positional information on photographic films as claimed in claim 6, wherein said determining means are designed to distinguish a photographic film containing any piece of positional information which has been erroneously read.

8. A device for reading positional information on photographic films used for reading, when a plurality of elongated photographic films connected with each other in the longitudinal direction through connecting members are being fed, pieces of positional information provided on the films in a predetermined order and in correspondence with a plurality of image frames recorded on the films in the longitudinal direction thereof, comprising:
   detecting means for detecting said pieces of positional information;
   determining means for determining whether or not an error has occurred in the detection of the pieces of positional information; and
   selecting means for selecting, if it is determined by said determining means that an error has occurred in the reading of the positional information, the correct image frame on the basis of those pieces of positional information for image frames which are adjacent to that piece of positional information which is determined to have been erroneously read.

9. A device for reading positional information on photographic films as claimed in claim 8, wherein said determining means are designed to determine whether or not any error has occurred by comparing previously stored positional information with positional information obtained by reading.

10. A device for reading positional information on photographic films as claimed in claim 9, wherein said piece of positional information consists of a bar code which is composed of a plurality of bars, and wherein said detecting means are designed to successively read said bars.

11. A device for reading positional information on photographic films as claimed in claim 9, further comprising memory means designed to successively shift and take in the bars of said bar code in the order in which they are read by said reading means.

12. A device for reading positional information on photographic film as claimed in claim 11, wherein said memory means cause the bars of said bar code to be successively shifted in the direction reverse to that in which they are taken in and to be extracted therefrom when said photographic film is fed in the reverse direction.

13. A device for reading positional information on photographic films as claimed in claim 12, wherein said detecting means are designed to detect the passing of said connecting members when said photographic films are being fed.

14. A device for reading positional information on photographic films as claimed in claim 13, wherein said determining means are designed to distinguish a photographic film containing any piece of positional information which has been erroneously read.

* * * * *